May 12, 1953 G. H. ROESCH 2,638,057
LOCOMOTIVE RAIL VEHICLE
Filed Feb. 7, 1949 3 Sheets-Sheet 1

Inventor
Georges H. Roesch
By
Attorneys

Patented May 12, 1953

2,638,057

UNITED STATES PATENT OFFICE 2,638,057

LOCOMOTIVE RAIL VEHICLE

Georges Henry Roesch, London, England, assignor to Power Jets (Research and Development) Limited, London, England, a British company Application February 7, 1949, Serial No. 74,914
In Great Britain February 13, 1948

2 Claims. (Cl. 105—62)

1

This invention relates to locomotive rail vehicles and more particularly to vehicles of the kind in which power is transmitted from a gas turbine to the driving wheels on spaced trucks, the gas turbine being supplied with working fluid from a gas generator mounted on the locomotive.

In one aspect the invention consists in an arrangement in the vehicle of the turbine and gas generator and the associated gas ducting in which a turbine of the axial flow type is supported from the locomotive chassis between the spaced trucks with its rotational axis extending longitudinally of the vehicle while a gas generator of the turbo-compressor type and an exhaust gas duct are disposed above the chassis and are inclined to direct gas to and from the turbine; thus generator, turbine and exhaust gas duct together form a V with the turbine at the apex of the V. Such a disposition of the essential components of a gas turbine locomotive affords advantages in that the passage of working fluid therethrough is accomplished with low duct losses, the continuity of flow being interrupted in the optimum case by only two obtuse angled bends. while at the same time it is economical of space and affords the necessary convenience, in regard to safety considerations, of disposition of the air intake and exhaust outlet. Moreover, the arrangement affords similar convenience as regards the disposition of the mechanism transmitting power from the turbine to the driving wheels on the trucks.

In this latter connection another aspect of the invention consists in the provision of a power transmitting mechanism comprising, disposed upon each truck, a reversible gear drive to two or more axles of the truck which drive is connected to the turbine shaft by extensible universally-jointed transmission shafts.

The various objects contemplated by the invention and the manner of their realization may best be understood from a consideration of the following description with reference to the accompanying drawings in which, by way of example, a constructional embodiment of the invention is illustrated.

2

Figure 2:
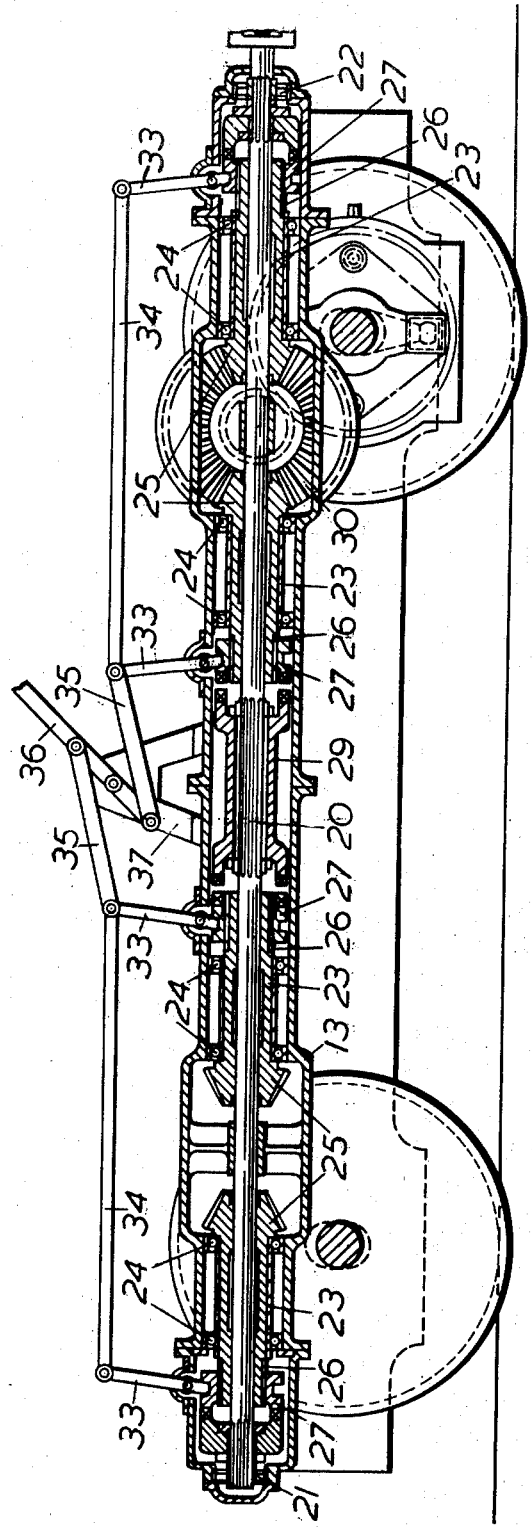
Figure 2 is a longitudinal cross-sectional elevation of a truck of the locomotive of Figure 1 showing in particular details of the mechanism transmitting power to the driving wheels.
Figure 3:
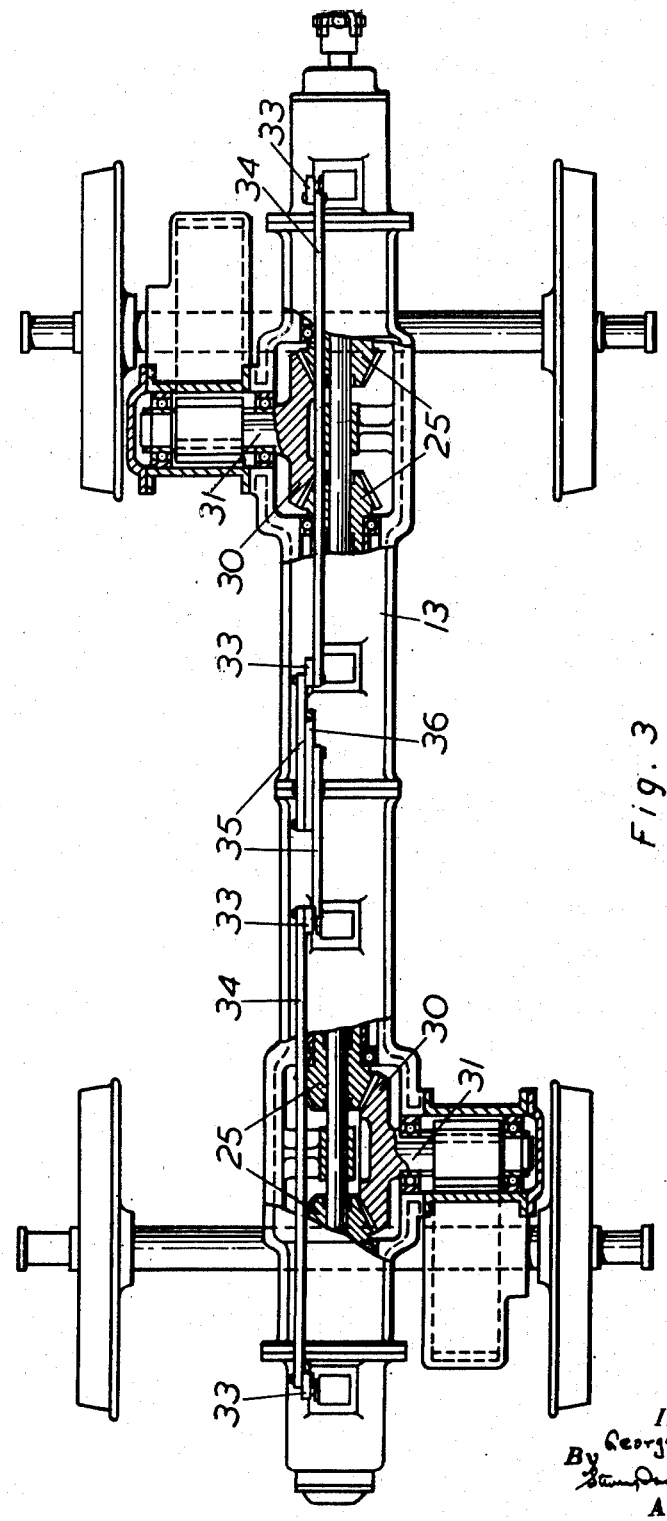

Figure 3 is a plan view partly sectional corresponding to the elevation of Figure 2.

Figure 1:
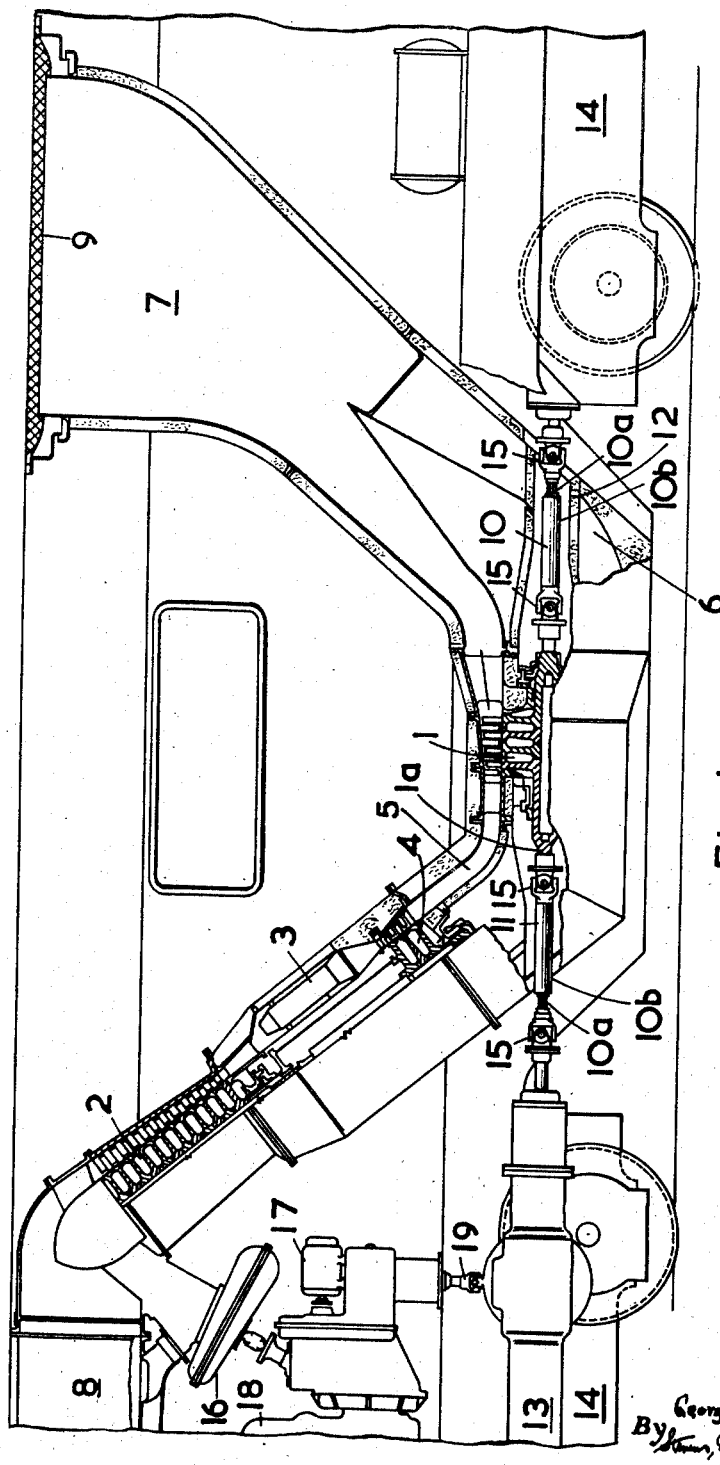
Figure 1 is a part of a longitudinal cross-sectional elevation of a locomotive embodying the features of the invention showing in particular the disposition of the various components of its power plant.

With reference to Figure 1 the axial flow gas turbine prime mover 1 receives gas from a generator comprising an axial flow air compressor 2, a combustion system 3 and a compressor-driving turbine 4 arranged for straight-through annular flow of the working fluid in a direction which is inclined to permit flow from the generator to the prime mover 1 through a single curved annular duct 5; the gases are exhausted from the prime mover through a single curved duct 6 leading to an inclined trunk 7. Air for the compressor 2 enters by way of a longitudinally facing intake in the upper structure of the vehicle (not shown) and a cleaning and silencing chamber 8 so that more effective intake flow is obtained when the vehicle moves in the direction from the right to the left hand side of the drawing, while the exhaust gases are discharged upwardly through the outlet 9. This arrangement of main components affords smooth changes in direction of, and is conducive to aerodynamic efficiency in the flow of working fluid in the vehicle. For transmitting the drive of the turbine 1 to the wheels of the locomotive, the turbine shaft 1a is connected at each end to universal joints 15 which are in turn each connected to the external member 10b of a telescopic transmission shaft having an internal member 10a in splined engagement with the external member 10b. The transmission shafts pass through the walls of the gas annuli of the curved ducts 5 and 6, being partitioned from the gas in the annuli by screening tubes 11 and 12. Further to the main propelling machinery the locomotive has auxiliary machinery comprising a centrifugal pump 16 which is geared to the rotor of the gas generating set and extracts deposits from the cleaning chamber 8; an electric generator 17 which is also geared to the gas-generator rotor; and an internal combustion engine 18 which by means of alternative clutching may be coupled either to a truck through the transmission shaft and gearing 19 which drives the geared section of the bogie thereby enabling shunting and like operations of the locomotive to be carried out on the auxiliary engine 18, or may be coupled to drive the centrifugal pump 16, electric generator 17 and gas generator rotor to start the main machinery.

The geared section of the transmission (see particularly Figures 2 and 3) comprises in each truck a driving shaft 20 attached to the outer universal joint 15 which shaft is journalled for rotation in the housing 13 by bearings 21, 22 at each end, the bearing 22 serving also to locate the shaft endwise in the housing. Enclosing the shaft 20 at spaced points along its length are four concentric sleeves 23 each of which is journalled and endwise located in the housing 13 by bearings 24. Integral with each sleeve there is provided at one end thereof a bevel gear wheel 25 and at the other end external splines 26 on which is engaged an axially slidable dog clutch element 27 having complementary internal splines so as to be rotatably fixed to the sleeve. The driving shaft 20 carries one fixed clutch element 28 at each end and a further double-ended intermediate fixed clutch element 29, each element being keyed and endwise located on the shaft 20. These fixed clutch elements are adapted to be engaged or disengaged by the slidable clutch elements 27 so as to bring the corresponding sleeve 23 and bevel wheel gear 25 into or out of rotational engagement with the shaft 20. Successive pairs of bevel wheel gears 25 are arranged in continuous mesh with a driven bevel gear wheel 30 mounted on a transverse driven shaft 31 which also carries a pinion 32 meshing with a further gear wheel (not shown) transmitting drive to the wheels on one axle of the truck. The slidable clutch elements 27 are each provided with an operating lever 33 pivoted in the housing 13 and the levers of the two clutch elements associated with the pair of bevel wheels 25 engaging a common driven bevel wheel 30 are interconnected by a pin jointed link 34. The two links 34 of a truck are further connected by pin jointed connecting rods 35 to spaced points on a common crank arm 36 which is supported at an intermediate point by a trunnion 37 from the housing 13 so that when the crank is rotated about its pivot the slidable clutch elements 27 each either engages or disengages its associated fixed clutch element. The arrangement is such that only either the two center or the two outer clutches (as in Figure 2) on the truck are engaged at any one time, these alternative engagements providing for forward and reverse drive of the locomotive. The disposition of the two driven bevel wheel gears 30 on opposite sides of the driving shaft 20 (see Figure 3) ensures that all the track wheels on the truck are driven in the same direction at any time. As well as providing for reversal of the locomotive, the geared sections of the transmission provide also for speed reduction between the turbine 1 and the track wheels.

The described arrangement of the drive transmitting mechanism has particular advantage in conjunction with the V form layout of the turbine working fluid flow path. The disposition of the entire geared section of the transmission on the trucks enables the shaft section of the transmission to be articulated at points closely adjacent both the turbine 1 and the trucks so avoiding excessive angling of the transmission shafts and, at the same time, allows the curved ducts 5 and 6 to effect the change of direction of the turbine working fluid gradually and therefore efficiently. Furthermore, the described arrangement of the principal components of a gas turbine locomotive is deemed to fulfil the more general requirements in regard to disposition of load to ensure adequate adhesion between the driving wheels and the track.

I claim:

1. A locomotive rail vehicle comprising a chassis, two supporting trucks pivotably attached thereto at longitudinally spaced points thereon, each truck carrying transmission means to transmit drive to at least one axle on said truck, a gas driven axial flow power turbine supported from said chassis and between said trucks for rotation about a longitudinally extending axis, extensible shafting connecting said power turbine and said transmission means on each truck to transmit drive thereto, a turbo-compressor gas generator mounted above said chassis, and inlet and exhaust gas ducting forming with said power turbine a gas flow path having the general form of a V with one limb extending upwardly and forwardly and the other limb extending upwardly and rearwardly from said power turbine, said turbo compressor gas generator being arranged with its rotational axis lying along one of said limbs.

2. A locomotive rail vehicle comprising a chassis, two supporting trucks pivotably attached thereto at longitudinally spaced points thereon, each truck having at least two axles, and a reversible gear drive mounted on the truck so as to be pivotable therewith relatively to said chassis and transmitting drive to at least two of said axles, a gas driven axial flow power turbine supported from said chassis and between and substantially level with said trucks for rotation about a longitudinally extending axis, said turbine being mounted on shafting extending therefrom in opposite directions, two extensible transmission shafts universally jointed to opposite ends of said power turbine shafting to connect respectively with each of said reversible gear drives, a turbo-compressor gas generator mounted above said chassis, and inlet and exhaust gas ducting forming with said power turbine a gas flow path having the general form of a V with one limb extending upwardly and forwardly and the other limb extending upwardly and rearwardly from said power turbine, said turbo compressor gas generator being arranged with its rotational axis lying along one of said limbs.

GEORGES HENRY ROESCH.

References Cited in the file of this patent

UNITED STATES PATENTS

| Number | Name | Date |
| --- | --- | --- |
| 1,054,314 | Riddle | Feb. 25, 1913 |
| 1,503,454 | Ford | July 29, 1924 |
| 2,029,981 | Black | Feb. 4, 1936 |
| 2,118,814 | Holzwarth | May 31, 1938 |
| 2,250,543 | Lysholm et al. | July 29, 1941 |

FOREIGN PATENTS

| Number | Country | Date |
| --- | --- | --- |
| 574,615 | France | Apr. 3, 1924 |
| Series 1, vol. 3 No. 60 | Italy | Mar. 12, 1866 |